United States Patent [19]

Klobucar et al.

[11] Patent Number: 5,101,002

[45] Date of Patent: Mar. 31, 1992

[54] CURED PHOSPHONITRILIC ELASTOMERS HAVING ALKYL-SUBSTITUTED ARYL UNITS

[75] Inventors: W. Dirk Klobucar; David M. Indyke, both of Baton Rouge, La.

[73] Assignee: Ethyl Corporation, Richmond, Va.

[21] Appl. No.: 587,022

[22] Filed: Sep. 24, 1990

Related U.S. Application Data

[63] Continuation-in-part of Ser. No. 432,174, Nov. 6, 1989, abandoned.

[51] Int. Cl.$^5$ .................... C08G 79/02; C08F 283/00
[52] U.S. Cl. .................... 528/168; 525/538; 528/167; 528/169; 528/399; 528/400
[58] Field of Search ............... 525/538; 528/167, 168, 528/169, 399, 400

[56] References Cited

U.S. PATENT DOCUMENTS

| | | | |
|---|---|---|---|
| 3,315,688 | 4/1967 | Sbarra | 132/9 |
| 3,660,165 | 5/1972 | Palmer | 429/42 |
| 3,700,629 | 10/1972 | Reynard et al. | 528/169 |
| 3,702,833 | 11/1972 | Rose et al. | |
| 3,856,712 | 12/1974 | Reynard et al. | |
| 3,888,800 | 6/1975 | Allcock | 528/401 |
| 4,116,785 | 9/1978 | Cheng | 204/159 |

OTHER PUBLICATIONS

G. L. Hagnauer et al., "Dilute Sol'n Char. Polyfluoroalkoxyphosphazenes" Journal of Polymer Science: vol. 10, 699-713 (1972).

G. Allen et al., "Polyphosphazenes: Part 1 Synthesis", p. 31, Dept. Chem. Univ. of Manchester.
"Phosphorous–Nitrogen Compounds", Academic Press, New York and London, 1972 by H. R. Allcock.
"Poly(organophosphazenes)", Chemtech, Sep. 19, 1975 by H. R. Allcock.

*Primary Examiner*—Harold D. Anderson
*Assistant Examiner*—T. Mosley
*Attorney, Agent, or Firm*—Richard J. Hammond

[57] ABSTRACT

Phosphazene polymers having the units

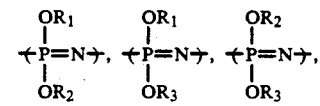

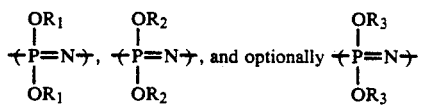

wherein the total number of units ranges from about 3 to about 50,000, $R_1$ and $R_2$ are different and are $C_1$ to $C_{12}$ linear or branched alkyl, $C_2$ to $C_{15}$ linear or branched fluoroalkyl or mixtures thereof, and $R_3$ is phenyl substituted with $C_1$ to $C_{12}$ linear or branched alkyl. The polymers can be cured with peroxides to yield cross-linked materials having enhanced elongation.

8 Claims, No Drawings

CURED PHOSPHONITRILIC ELASTOMERS HAVING ALKYL-SUBSTITUTED ARYL UNITS

This is a continuation-in-part of application Ser. No. 07/432,174, filed Nov. 6, 1989 abandoned.

This invention relates to polymers containing —P=N— repeating units in the polymer chain to which curable groups are attached. More particularly, this invention relates to polyphosphazenes having alkyl-substituted aryl units as curable sites.

BACKGROUND

Polyphosphazenes containing repeating phosphonitrilic units which have various alkoxy, substituted alkoxy, aryloxy and substituted aryloxy groups attached to the backbone phosphorous atoms and their method of preparation are described extensively in the prior art. For example, see "Nitrogen-Phosphorous Compounds", Academic Press, New York, N.Y., 1972 by H. R. Allcock, and also "Poly(organophosphazenes)", Chemtech, Sept. 19, 1975 by H. R. Allcock as well as U.S. Pat. Nos. 3,700,629; 3,702,833 and 3,856,712. The disclosures of these patents are incorporated herein by reference.

U.S. Pat. No. 3,700,629 discloses high molecular weight polyphosphazene copolymers having increased thermal stability. These copolymers contain randomly distributed substituents on the phosphonitrilic backbone that are fluoroalkoxy and substituted aryloxy, the substituents including $C_1$ to $C_5$ alkyl. The ratio of such fluoroalkoxy groups to aryloxy groups covers a range of 1:9 to 3:1.

While curable fluoroalkoxy and/or aryloxy elastomeric polyphosphazene copolymers are known, these compositions utilize groups displaying some degree of olefinic unsaturation to effect the cross-linking (curing). See for example U.S. Pat. Nos. 3,702,833 and 4,116,785.

The present invention is directed to the preparation of cured (cross-linked) polyphosphazenes using, as a cross-linking site, a chemical group that has heretofore not been known to take part in the cross-linking reaction.

Briefly, cross-linked polymers having enhanced elongation properties are prepared using conventional cross-linking agents, such as peroxides (benzoyl peroxide, dicumylperoxide, etc.) or radiation, with the phosphonitrilic polymers having the units:

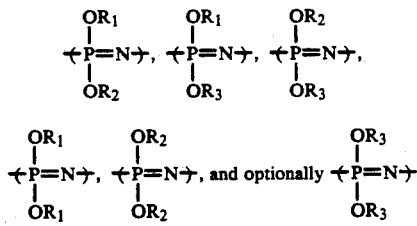

where the total number of units ranges from about 3 to about 50,000, $R_1$ and $R_2$ are different and are $C_1$ to $C_{12}$ linear or branched alkyl, $C_2$ to $C_{15}$ linear or branched fluoroalkyl or mixtures thereof, and $R_3$ is phenyl substituted with $C_1$ to $C_{12}$ linear or branched alkyl.

In the preferred compositions of the present invention, $R_1$ and $R_2$ are $C_1$ to $C_6$ linear or branched alkyl, $C_2$ to $C_{15}$ linear or branched fluoroalkyl, or mixtures thereof. In such preferred composition $R_3$ is preferably phenyl substituted with $C_1$ to $C_6$ linear or branched alkyl.

Most preferred compositions of the present invention include those where $R_1$ and $R_2$ are $HCF_2(CF_2)_nCH_2$— or $F_3C(CF_2)_nCH_2$— where n is an integer of from 0 to 13. The value of n need not be the same on each fluoroalkoxy substituent, because mixtures of fluoroalkoxy groups are included within the scope of this invention. Examples of most preferred alkyl substituents in $R_3$ include methyl, ethyl, n-propyl, isopropyl and the like. Typical examples of the above mentioned fluoroalkyl groups include 2,2,2-trifluoroethyl, 2,2,3,3,3-pentafluoropropyl, 2,2,3,3-tetrafluoropropyl, 2,2,3,3,4,4,4-heptafluorobutyl, 2,2,3,3,4,4,5,5- octafluoropentyl and the like.

Among the most preferred polymers of the present invention, particularly preferred are those where $R_1$ is —$CH_2CF_3$ and $R_2$ is $HCF_2(CF_2)_nCH_2$— where n has a value of 1 to 13, averaging about 3.

The groups —$OR_3$ are effective in the cross-linking reaction at concentrations from about 0.1 to about 20 mole % based on total moles of substituents in the polymer. The cross-linking agents are typically brought in contact with the uncured polymer by milling or otherwise mixing the polymer so as to uniformly disperse the additives. Curing is typically accomplished by heating the milled compositions to temperatures ranging from about 100° C. to about 200° C.

The overall result is to produce a cross-linked polymer of enhanced elongation useful as a sealing material and for gaskets, adhesives, coatings and the like.

The polymers of the present invention are prepared by reacting at least three different alkali metal salts with linear soluble $[PNCl_2]_x$ polymer. For example, a benzene solution of the linear, soluble $[PNCl_2]_x$ polymer is combined with one or more (if reacted step-wise) solutions of the sodium salts of the alcohols $R_1OH$, $R_2OH$ and $R_3OH$ in tetrahydrofuran and reacted under suitable conditions. A polymer containing random units of the structures set forth above results. These polymers are high molecular weight materials and are completely substituted. They typically have low glass transition temperatures and are usually thermally stable to over 300° C. as measured on a thermobalance.

The solubilities of these polymers vary widely with the nature of the substituent groups. Some materials are soluble in most common organic solvents, while other polymers are soluble only in certain fluorocarbon solvents.

The invention is illustrated by the following examples, which are not intended to limit the invention.

EXAMPLE 1

(a) Preparation of poly(dichlorophosphazene)

The polyorganophosphazenes are readily made by first reacting ammonium chloride with phosphorus pentachloride in monochlorobenzene solvent at 120°–130° C. to form a mixture of cyclic and low molecular weight linear chlorophosphazenes. After removing the reaction solvent, the cyclic phosphazenes can be separated by any of several techniques, including extraction, crystallization, distillation or sublimation.

High molecular weight linear poly(dichlorophosphazene) can be made by purifying the cyclics and then heating them under an inert atmosphere at about 180°–270° C. for 2–24 hours or more until the desired degree of polymerization has occurred. A small amount of a catalyst such as boron trichloride can be added to promote the polymerization. The polymerization mixture can then be dissolved in a solvent such as chlorobenzene, toluene or cyclohexane and this solution added to a nonsolvent such as heptane, which will cause the high molecular weight linear polydichlorophosphazenes to precipitate, leaving the cyclic species in solution to be easily separated from the high molecular weight linear polydichlorophosphazenes. The poly(dichlorophosphazene) is redissolved in a solvent such as benzene, toluene or cyclohexane.

(b) Preparation of [NP(OCH$_2$CF$_3$)$_y$(OCH$_2$(CF$_2$)$_m$—H)$_x$]$_n$ with approximately 2.8% p-ethylphenoxy substituents A clean, dry reaction flask equipped with a nitrogen inlet, offset adapter, addition funnel, reflux condenser and a mechanical stirrer was used. To the flask was added 890.1 g of a tetrahydrofuran solution of 730 meq (89.0 grams) of sodium trifluoroethoxide and 392 meq (101 grams) of sodium polyfluoroalkoxide [NaOCH$_2$(CF$_2$)$_m$H] in which m has a value of 1-14, averaging about 4, 22.5 g of sodium p-ethylphenoxide solution [42.1 meq], and 681 g of dry tetrahydrofuran. To an addition funnel was added 764.5 g of poly(dichlorophosphazene) solution containing 81.5 g of polymer [1406 meq chloride]. This is added to the alkoxides over a period of 40 min at 26°–49° C. The reaction mixture was stirred for an additional 30 minutes at 50° C. An additional 281 g of the above sodium fluoroalkoxide solution (355 meq) was added. The reaction mixture was stirred for 6 hours at 60° C. and acidified by the addition of concentrated sulfuric acid. Salts were agglomerated by the addition of 100 g of aqueous saturated sodium bromide solution. The reaction mixture was centrifuged and the polymer gum precipitated by the slow addition of the decantate to 16 liters of hexanes. The gum was collected and redissolved in 2.7 liters of acetone. The solution was centrifuged and the gum re-precipitated by the slow addition of the resultant solution to 12 liters of deionized water. The gum was collected and dissolved in 2.7 liters of acetone solution. The solution was centrifuged and the gum again precipitated by the slow addition of the resultant solution to 12 liters of deionized water. The gum was collected and air dried overnight and then dried to constant weight in a vacuum oven at 60° C. and greater than 30 in Hg of vacuum. There was obtained 182.7 g of light beige gum.

| Total Chloride | 0.036 wt % |
|---|---|
| Intrinsic Viscosity (acetone, 25° C.) | 2.7 dl/g |
| Glass Transition Temperature (Tg) | −65° C. |
| p-ethylphenoxy content | 2.8 mole % |

EXAMPLE 2

Polyfluoroalkoxyphosphazene with 2.0 mole % p-ethylphenoxy substituent

To a reaction flask was added 763.4 g of poly(dichlorophosphazene) solution containing 81.4 g of polymer (1404 meq of chloride) and 22.5 g sodium p-ethylphenoxide solution [42.1 meq] and 171 g of dry THF. An additional 237 g of the THF was added to reduce the viscosity of the reaction mixture. The chloropolymer mixture was stirred for 30 minutes at room temperature. To a second larger flask was added 615 g of dry tetrahydrofuran and 1171 g (1474 meq) of the fluoroalkoxide solution used in Example 1. The poly(dichlorophosphazene), p-ethylphenoxide mixture was added to the alkoxides at 26°–57° C. over 8 minutes. The reaction mixture was allowed to stir for 6 hours at 60° C. and then stand over the weekend. The reaction mixture was acidified by the addition of 3.7 g of concentrated sulfuric acid. A saturated aqueous solution of sodium bromide (61.2 g) was added. The reaction mixture was centrifuged and the gum precipitated by the slow addition of the decantate to 16 liters of hexanes. Most of the liquid was decanted, and 8 liters of warm water (40° C.) was added. Most of the remaining volatile organics were quickly evaporated (15 minutes) by passing compressed air over the stirred mixture. The gum was collected and redissolved in 2.7 liters of acetone. The solution was centrifuged and the gum precipitated by the slow addition of the decantate to 12 liters of deionized water. The gum was allowed to air dry in a hood for 2 days and then brought to constant weight in a vacuum oven at 60° C. and greater than 30 in Hg of vacuum. There was obtained 185.8 g of beige gum.

| Total Chloride | 0.004 wt % |
|---|---|
| Intrinsic Viscosity (acetone, 25° C.) | 1.9 dl/g |
| Glass Transition Temperature (Tg) | −65° C. |
| p-ethylphenoxy content | 2.0 mole % |

EXAMPLES 3 & 4

Example 2 was repeated using sodium p-ethylphenoxide concentrations that were 5.1 mole % and 2.0 mole %.

|  | Example 3 | Example 4 |
|---|---|---|
| Total Chloride | 0.005 | 0.005 wt % |
| Intrinsic Viscosity (acetone, 25° C.) | 1.9 | 2.2 dl/g |
| Glass Transition Temperature (Tg) | −71° C. | −74° C. |
| p-ethylphenoxy content | 4.2 | 1.6 mole % |

Polymers of the present invention can be readily compounded and cured, producing useful products possessing an outstanding combination of properties. These properties are substantially retained over an extreme temperature range from temperatures as low as −80° F. to temperatures as high as 400° F., thus permitting the use of these articles in varied service applications.

The presence of the alkyl phenoxide substituents results in polymers which can be cured with higher levels of peroxide than polymers having olefinic unsaturation attached to the polyphosphazene chain. The resulting materials possess higher elongation at a given hardness level than the commercial EYPEL -F elastomer containing ortho-allylphenoxy substituents. It is possible to use peroxide curing agents as well as radiation cures.

The properties of several different polymer gums and the compounded stock obtained from them are illustrative and set forth in Table I which follows. Compounding was achieved by simply mixing the several constituents with the polyphosphazene gums in a Banbury mixer. Other conventional mixers are equally satisfactory.

Phosphonitrilic fluoroelastomer in which the units are randomly distributed along the

backbone is produced by the above described method and Examples.

It is usually a light tan crumb which exhibits no cold flow. It possesses the following properties (average):

| | |
|---|---|
| Intrinsic Viscosity (dL/g) | 1.9–2.9 |
| Glass Transition Temperature (°C.) | −65° to −92° F. |
| Total Chloride (wt %) | .004–.036 |

The raw gum feels quite tough and exhibits considerable "nerve". It softens readily at high shear rates, as for example when processed on a rubber mill or in an extruder or mixer, and it exhibits good green strength and nerve reduction after addition of reinforcing agents such as carbon blacks, silicas or treated clays.

Tensile and elongation properties were obtained following ASTM D 412-83, Method B (Standard Test Methods for Rubber Properties in Tension). The term "modulus" is used following common usage to refer to tensile stress at a given relative elongation. English units (psi) have been used.

In the same tensile strength test, elongation at the breaking point was also measured both before and after heat aging of the test specimens. Elongation properties are reported as the percent increase above the original length of the test specimen. Higher values are preferred.

Compression set measurements were obtained following ASTM D 395-78 (Standard Test Methods for Rubber Property-Compression Set) using Method B (constant deflection). A molded Type 1 specimen (0.5" thick) was used and compressed 25% under the conditions noted. Smaller compression set values indicate less retention of the test compression conditions and are improvements.

High modulus values are preferred in many applications, particularly in seals and gaskets. High tensile strengths are always preferred.

All formulations contained 75.0 g of polymer, 27.0 g of inorganic filler, 1.50 g of stabilizer and peroxide curing agent [40% active α,α'-bis(tert-butylperoxy)diisopropylbenzene on clay, (Vul-Cup 40KE, Hercules, Inc.]. Peroxide levels (see Table I) were adjusted so that torque increases measured on a Monsanto Rheometer by ASTM D2084 were nearly equal, indicating materials of similar crosslink densities. The formulated gums were cured for 30 minutes (50 minutes for compression set buttons) at 171° C. and then post-cured 4 hours at 177° C. Fifty percent moduli and tensile strengths were measured initially and after aging at a specified time and temperature. Compression sets were measured after compressing the test specimen for a specified time at a specified temperature.

For comparative purposes, an identical formulation was prepared except that, instead of containing 75 grams of the gum from Example 1, it contained a commercially available substantially linear, high molecular weight polyfluoroalkoxyphosphazene polymer consisting of a substantially linear chain of alternating N and P atoms, in which substituents on the P atoms included o-allyl phenoxy, —OCH$_2$CF$_3$ and HF$_2$C—(CF$_2$)$_m$—CH$_2$O groups in which m had a value of 1–13, averaging about 3. The following Table I illustrates the test results.

TABLE I

Comparison of the Heat Aging Effects on Cured Polymers of the Present Invention

| Physical Property | 1 | 2 | 3 | 4 | Comp |
|---|---|---|---|---|---|
| Tensile Mod 50% elong-original | 221 | 169 | 175 | 194 | 280 |
| 70 hr/200° C. | 197 | 157 | 182 | 191 | 248 |
| 120 hr/200° C. | 197 | 169 | 198 | 187 | 228 |
| Tensile Mod 100% elong-original | 576 | 463 | 493 | 509 | 863 |
| 70 hr/200° C. | 433 | 417 | 496 | 442 | 630 |
| 120 hr/200° C. | 389 | 401 | 406 | 384 | 409 |
| Tensile Strength-original | 1874 | 2161 | 1995 | 1900 | 1719 |
| 70 hr/200° C. | 1042 | 1571 | 1660 | 1071 | 1174 |
| 120 hr/200° C. | 885 | 1470 | 1499 | 875 | 917 |
| Elongation @ Break-original | 226 | 259 | 238 | 251 | 164 |
| hr/200° C. | 242 | 268 | 250 | 229 | 180 |
| 120 hr/200° C. | 262 | 282 | 252 | 231 | 198 |
| Durometer, Shore A (ASTM D2240) | 61 | 59 | 56 | 58 | 60 |
| Compression Set-70 hr/149° C. | 53 | 41 | 41 | 54 | 29 |
| Vulcup 40KE (phr) (ASTM D395) | 1.28 | 1.11 | 1.03 | 1.51 | 0.80 |

We claim:

1. A curable, linear phosphazene polymer having the units

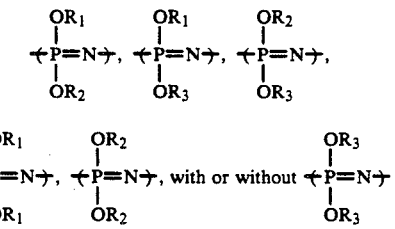

where the total number of units ranges from about 3 to about 50,000, R$_1$ and R$_2$ are different and are C$_1$ to C$_{12}$ linear or branched alkyl, C$_2$ to C$_{15}$ linear or branched fluoroalkyl or mixtures thereof, and R$_3$ is phenyl substituted with C$_1$ to C$_{12}$ linear or branched alkyl.

2. The polymer according to claim 1 wherein R$_1$ and R$_2$ are fluoroalkyl of the formulae CF$_3$CH$_2$— and CF$_2$H(CF$_2$)$_n$(CH$_2$)— where n is an integer from 1 to 13.

3. The polymer according to claim 2 wherein R$_3$ is phenyl substituted with C$_1$ to C$_6$ linear or branched alkyl.

4. The polymer according to claim 3 wherein R$_3$ is phenyl substituted with p-methyl, p-ethyl, m-methyl, m-ethyl, o-methyl or o-ethyl.

5. The polymer of claim 1 wherein R$_1$ and R$_2$ are C$_1$ to C$_6$ linear or branched alkyl.

6. The polymer according to claim 5 wherein R$_3$ is phenyl substituted with C$_1$ to C$_6$ linear or branched alkyl.

7. A process for curing a linear phosphazene polymer, having the units

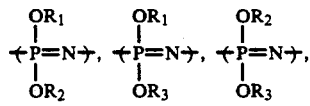

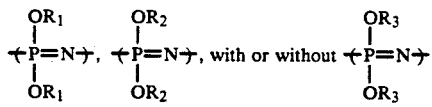, with or without 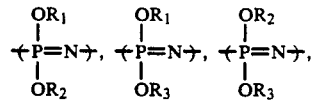

where the total number of units ranges from about 3 to about 50,000, $R_1$ and $R_2$ are different and are $C_1$ to $C_{12}$ linear or branched alkyl, $C_2$ to $C_{15}$ linear or branched fluoroalkyl or mixtures thereof, and $R_3$ is phenyl substituted with $C_1$ to $C_{12}$ linear or branched alkyl, which comprises heating said polymer within the range from about 100° C. to about 200° C. in the presence of peroxide curing agent.

8. A cured polyphosphazene prepared by the process of heating a curable linear phosphazene polymer having the units

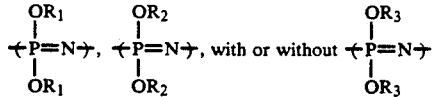

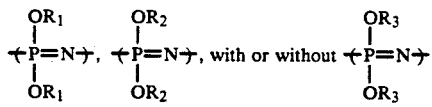, with or without 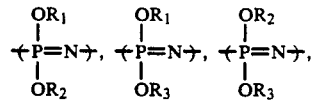

where the total number of units range from about 3 to about 50,000, $R_1$ and $R_2$ are different and are $C_1$ to $C_{12}$ linear or branched alkyl, $C_2$ to $C_{15}$ linear or branched fluoroalkyl or mixtures thereof, and $R_3$ is phenyl substituted with $C_1$ to $C_{12}$ linear or branched alkyl, prepared by the process which comprises heating said polymer within the range from about 100° C. to about 200° C. in the presence of peroxide curing agent.

* * * * *